(12) United States Patent
Adachi

(10) Patent No.: US 10,207,570 B2
(45) Date of Patent: Feb. 19, 2019

(54) VEHICLE REAR PORTION STRUCTURE

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/817,711

(22) Filed: Nov. 20, 2017

(65) Prior Publication Data
US 2018/0194210 A1 Jul. 12, 2018

(30) Foreign Application Priority Data
Jan. 11, 2017 (JP) .................. 2017-002865

(51) Int. Cl.
*B60J 10/25* (2016.01)
*B60J 1/18* (2006.01)
*B60J 5/10* (2006.01)
*B62D 35/00* (2006.01)

(52) U.S. Cl.
CPC ............. *B60J 10/25* (2016.02); *B60J 1/1838* (2013.01); *B60J 5/101* (2013.01); *B62D 35/007* (2013.01)

(58) Field of Classification Search
CPC ........... B60J 10/25; B60J 1/1838; B60J 5/101
USPC .................................... 296/146.8, 76
See application file for complete search history.

(56) References Cited

U.S. PATENT DOCUMENTS

| 7,914,066 B2* | 3/2011 | Miyake ................. B60J 5/107 296/146.6 |
| 9,931,914 B2* | 4/2018 | Kawashima ............ B60J 5/101 |
| 2010/0102590 A1* | 4/2010 | Miyake ................... B60J 5/101 296/146.8 |

FOREIGN PATENT DOCUMENTS

| JP | 2000-219167 A | 8/2000 |
| JP | 2004-203071 A | 7/2004 |

* cited by examiner

*Primary Examiner* — Joseph D. Pape
(74) *Attorney, Agent, or Firm* — Oliff PLC

(57) ABSTRACT

A vehicle rear portion structure that comprises: a first glass that is provided at a vehicle rear portion, and at which is formed a sunken portion that is sunken-in further toward a substantially vehicle lower side than portions adjacent thereto in a vehicle transverse direction; a connecting portion that is provided between the first glass and a second glass, and that leads drainage water, which flows from the sunken portion, to the second glass; and an additional member having a guide portion that extends toward a vehicle rear side from an upper portion of the second glass, and that guides the drainage water from the connecting portion to a position that is away, toward a vehicle rear side, from a vehicle rear side surface of the second glass.

10 Claims, 6 Drawing Sheets

VEHICLE REAR PORTION STRUCTURE

CROSS-REFERENCE TO RELATED APPLICATION

This application is based on and claims priority under 35 USC 119 from Japanese Patent Application No. 2017-002865 filed on Jan. 11, 2017, which is incorporated by reference herein.

BACKGROUND

Technical Field

The present disclosure relates to a vehicle rear portion structure.

Related Art

Japanese Patent Application Laid-Open (JP-A) No. 2000-219617 discloses a vehicle rear portion structure in which a spoiler is provided at the upper portion of a rear window glass. In this vehicle rear portion structure, water droplets and the like that stick to the rear window glass are removed by forming a gap between the spoiler and the rear window glass.

In a structure in which a rear window glass is divided into upper and lower sections, there are cases in which the spoiler is provided between a first glass that is at the upper side and a second glass that is at the lower side. In this case, the water droplets that stick to the first glass flow to the second glass through a space that is formed at the lower side of the spoiler.

Here, if the vehicle transverse direction central portion of the first glass is formed in a sunken shape for the purpose of improving the aerodynamic characteristics and the design and the like, there is the possibility that the water that flows from the first glass will concentrate at the vehicle transverse direction central portion, and that water will stick locally to the vehicle transverse direction central portion of the second glass. Further, there is the concern that rain stains will arise and the appearance will deteriorate at the portion where water sticks locally.

SUMMARY

An object of the present disclosure is to provide a vehicle rear portion structure that can suppress rain stains arising at a second glass, in a vehicle rear portion structure in which a sunken portion is formed at a first glass.

A vehicle rear portion structure of an aspect has: a first glass that is provided at a vehicle rear portion, and at which is formed a sunken portion that is sunken-in toward a substantially vehicle lower side with respect to portions adjacent thereto in a vehicle transverse direction; a second glass that is provided further toward a vehicle rear side and a vehicle lower side than the first glass, and that is disposed with a plate thickness direction thereof being a substantially vehicle longitudinal direction; a connecting portion that is provided between the first glass and the second glass, and that leads drainage water, which flows from the sunken-portion, to the second glass; and an additional member having a guide portion that extends toward a vehicle rear side from an upper portion of the second glass, and that guides the drainage water from the connecting portion to a position that is away, toward a vehicle rear side, from a vehicle rear side surface of the second glass.

DESCRIPTION OF EMBODIMENT

A vehicle rear portion structure S relating to an embodiment of the present disclosure is described hereinafter by using the drawings.

Note that arrow RR that is shown appropriately in the respective drawings indicates the vehicle rear side, arrow UP indicates the vehicle upper side, and arrow RH indicates the vehicle transverse direction right side. Further, when longitudinal, vertical and left-right directions are used in the following description without being specified, they refer to the longitudinal of the vehicle longitudinal direction, the vertical of the vehicle vertical direction, and the left and right of the vehicle transverse direction.

Figure 2:
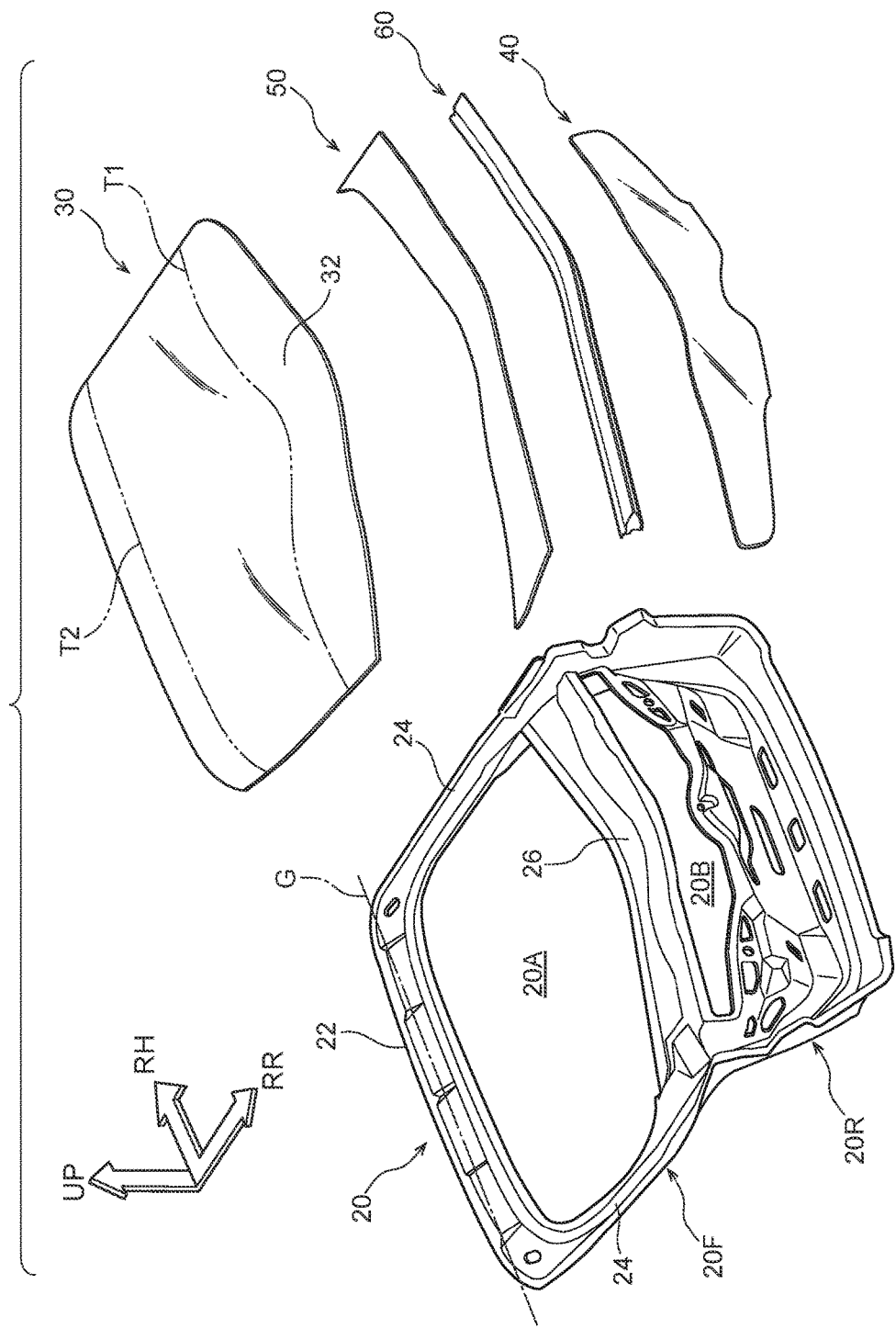
FIG. 2 is an exploded perspective view showing main structural parts of a back door.
Figure 3:
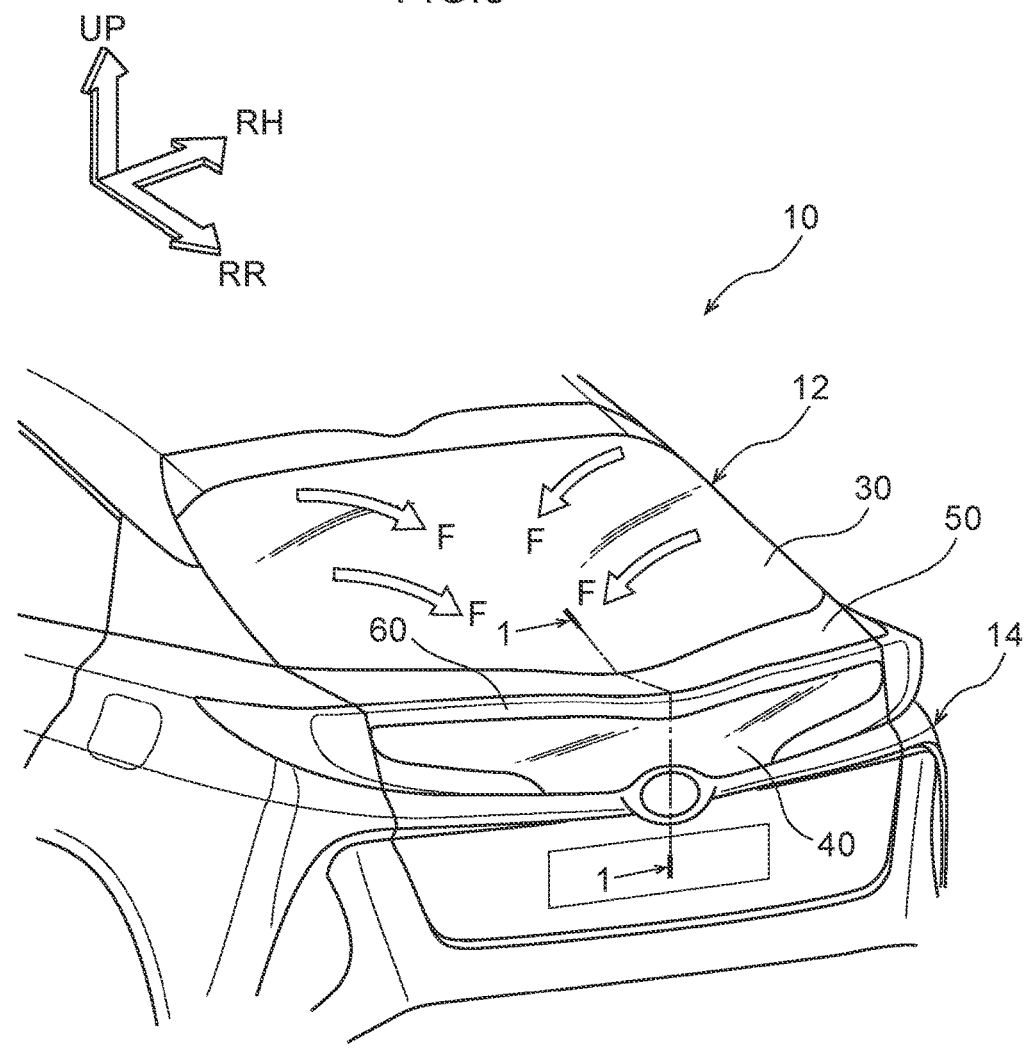
FIG. 3 is a perspective view that is seen from a vehicle rear side and shows the periphery of the back door of a vehicle.

FIG. 3 is a perspective view that is seen from the vehicle rear side and shows the periphery of a back door 12 of a vehicle 10 to which the vehicle rear portion structure S is applied. FIG. 2 is an exploded perspective view showing main structural parts of the back door 12. As shown in FIG. 2, the back door 12 is structured to include a back door panel 20 that structures the frame of the back door 12, a back door glass 30, a back door lower glass 40, and a spoiler 50 and a high-mount stop lamp 60 that serve as an "exterior member".

Note that, when the structures of the respective parts are described by using directions hereinafter, description is given with the directions being those in the state in which the back door 12 is closed (the state shown in FIG. 3).

The back door panel 20 (hereinafter called "BD panel 20") is formed in a substantial L-shape as seen in a vehicle side view. In detail, the BD panel 20 has a panel front portion 20F that structures the front portion of the BD panel 20 and is slanted downward gently while heading toward the rear side, and a panel rear portion 20R that extends substantially vertically toward the lower side from the rear end of the panel front portion 20F. The BD panel 20 is mounted, via hinges that are provided at the front end portion of the panel front portion 20F, to a vehicle body 14 so as to be able to rotate around an axis G whose axial direction is the vehicle transverse direction (refer to one-dot chain line G in FIG. 2).

A first opening portion 20A is formed in the panel front portion 20F, and a second opening portion 20B is formed in the panel rear portion 20R. The first opening portion 20A is formed to be large in the substantial center of the panel front portion 20F. Therefore, the panel front portion 20F has a front frame portion 22 that structures the front side of the first opening portion 20A, a pair of left and right lateral frame portions 24 that structure the left and right both sides of the first opening portion 20A, and a rear frame portion 26 that structures the rear side of the first opening portion 20A. On the other hand, the second opening portion 20B is formed in a shape that is long in the vehicle transverse direction, and is formed in a vicinity of the upper end of the panel rear portion 20R.

The back door glass 30 (hereinafter called "BD glass 30") is disposed in the first opening portion 20A of the BD panel 20, and is in an inclined state of slanting downward gently while heading toward the rear side.

As shown in FIG. 2, in a cross-section in which the BD glass 30 is cut at a plane orthogonal to the vehicle longitudinal direction (refer to two-dot chain line T1), a sunken portion 32, which is formed in a shape that sinks-in toward the vehicle lower side with respect to the portions that are adjacent thereto in the vehicle transverse direction, is formed in the BD glass 30. The sunken portion 32 is formed at the vehicle transverse direction central portion of the BD glass 30. In the state in which the BD glass 30 is mounted to the BD panel 20, the sunken portion 32 of the BD glass 30 is positioned at the vehicle transverse direction central portion of the vehicle 10. Due thereto, as shown by arrow F in FIG. 3, rainwater that flows on the obverse (the surface at the vehicle upper side) of the BD glass 30 collects in the vehicle transverse direction central portion where the sunken portion 32 is formed, while flowing toward the vehicle rear side.

Note that, as shown by two-dot chain line T2 in FIG. 2, the sunken portion 32 is not formed in the front portion of the BD glass 30. The region where the sunken portion 32 is formed is the range from the longitudinal direction central portion to the rear end portion of the BD glass 30.

The back door lower glass 40 (hereinafter called "BD lower glass 40") is disposed in the second opening portion 20B of the BD panel 20, and is in a state in which the plate thickness direction thereof is the substantially vehicle longitudinal direction.

The spoiler 50 and the high-mount stop lamp 60 (hereinafter called "HMSL 60") are disposed so as to cover and hide, from the vehicle outer side, the rear frame portion 26 which is the portion of the BD panel 20 between the first opening portion 20A and the second opening portion 20B.

Figure 1:
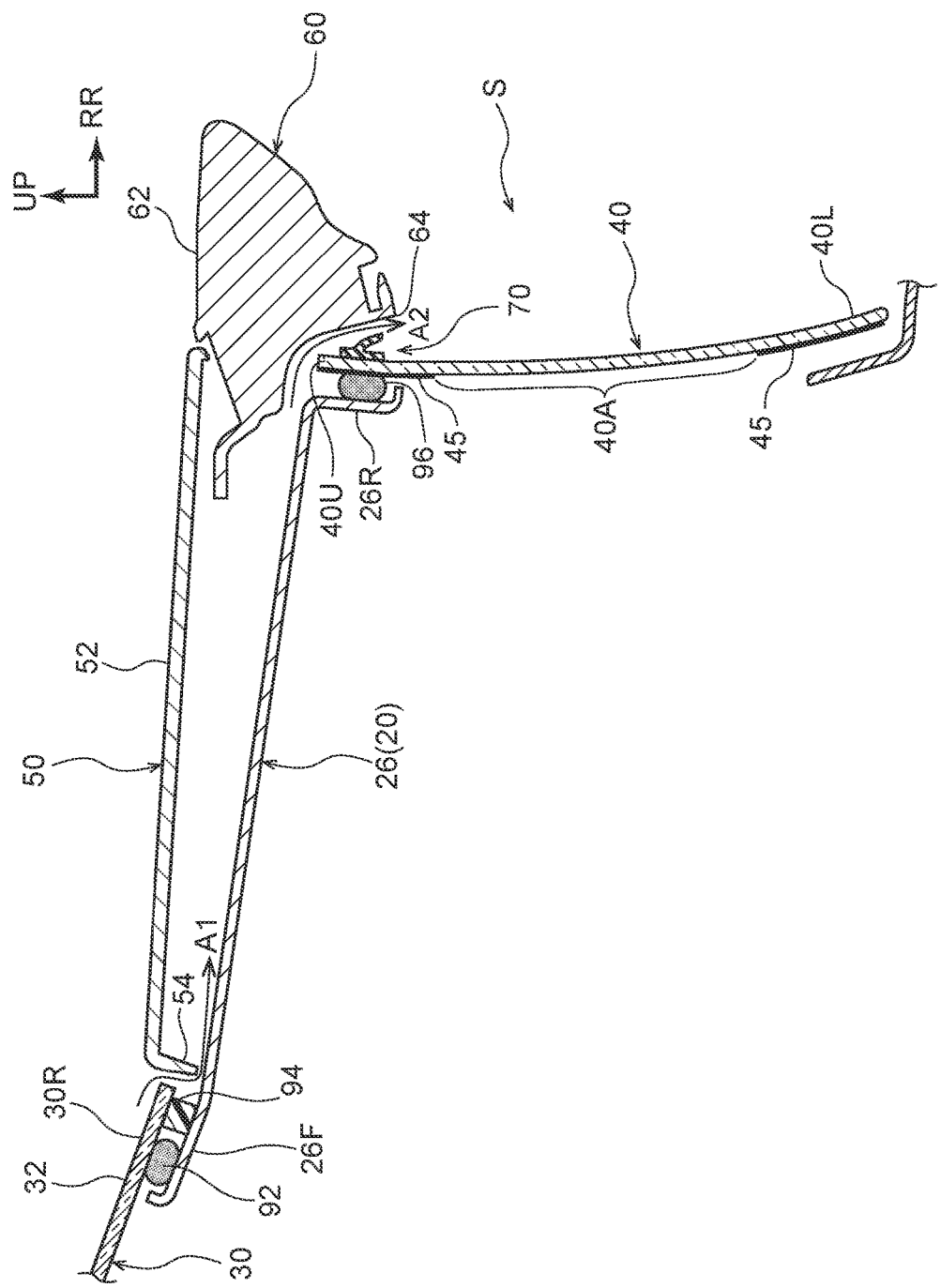
FIG. 1 is a cross-sectional view (a cross-sectional view along line 1-1 of FIG. 3) showing a vehicle rear portion structure of an embodiment.

FIG. 1 is a cross-sectional view along line 1-1 of FIG. 3 (a cut end view), i.e., a cross-sectional view showing, in an enlarged manner, the portion of the back door 12 to which the vehicle rear portion structure S is applied. The rear frame portion 26, which serves as a "connecting portion" and is a portion of the BD panel 20, is shown in FIG. 1. Hereinafter, to simplify explanation, the rear frame portion 26 of the BD panel 20 is called the "BD panel 20".

As shown in FIG. 1, a rear end portion 30R of the BD glass 30 is adhered by an adhesive 92 to a front end portion 26F of the BD panel 20. The rear end portion 30R of the BD glass 30 is disposed above the front end portion 26F of the BD panel 20, and the lower surface of the BD glass 30 and the upper surface of the BD panel are adhered together. Sealing between the rear end portion 30R of the BD glass 30 and the BD panel 20 is ensured by the adhesive 92. Further, a spacer 94, which prescribes the interval between the rear end portion 30R of the BD glass 30 and the front end portion 26F of the BD panel 20, is disposed between this rear end portion 30R and front end portion 26F.

The BD panel 20 is formed in the shape of a plate, and the overall plate thickness direction thereof is the substantially upward direction of the vehicle, and, in detail, is a direction that is inclined slightly toward the vehicle rear side with respect to the vehicle upper side. A vertical wall portion 26R that is bent toward the vehicle lower side is formed at the rear end portion of the BD panel 20.

The reverse (the surface at the vehicle front side) of an upper portion 40U of the BD lower glass 40 is adhered by adhesive 96 to the vehicle rear side surface of the vertical wall portion 26R. Sealing between the BD panel 20 and the upper portion 40U of the BD lower glass 40 is ensured by the adhesive 96. Due thereto, the water that flows on the BD panel 20 is led to the obverse side of the BD lower glass 40 (refer to arrow A2).

The BD lower glass 40 is curved so as to be convex toward the vehicle front side as seen in a vehicle side view. As shown in FIG. 1, the cross-sectional shape of the BD lower glass 40, when cut in a plane orthogonal to the vehicle transverse direction at the vehicle transverse direction center, is a curved shape that is convex toward the vehicle front side. In detail, the cross-sectional shape of the BD lower glass 40 is a shape that runs along the vehicle vertical direction at the upper portion 40U thereof, and is a shape that is curved toward the vehicle rear side while heading toward a lower portion 40L.

Ceramic printing 45 is carried out on the reverse (the surface at the vehicle front side) at the edge portions of the BD lower glass 40. Note that, because FIG. 1 is a cross-sectional view at the vehicle transverse direction center, FIG. 1 shows a situation in which the ceramic printing 45 has been carried out on the upper portion 40U and the lower portion 40L of the BD lower glass 40. Due thereto, the edge portions of the BD lower glass 40 are non-transmissive portions that make it impossible to see the adhesive 96 and the like from the vehicle outer side. The portion, other than the non-transmissive portions, of the BD lower glass 40 is a transmissive portion 40A that is transmissive.

The spoiler 50 is provided above the BD panel 20. The spoiler 50 is disposed in a state in which the overall plate thickness thereof is the substantially vehicle vertical direction. As shown in FIG. 2, the spoiler 50 is a shape that is long in the vehicle transverse direction, and hides the rear frame portion 26 of the BD panel 20 from the vehicle upper side over substantially the entire vehicle transverse direction.

As shown in FIG. 1, the spoiler 50 has a main body portion 52 whose plate thickness direction is the substantially vehicle vertical direction, and a bent portion 54 that extends substantially toward the lower side from the front end of the main body portion 52. A gap in the vehicle longitudinal direction is formed between the front end (the bent portion 54) of the spoiler 50 and the rear end portion 30R of the BD glass 30. A gap in the vehicle vertical direction is formed between the distal end (the lower end) of the bent portion 54 of the spoiler 50 and the BD panel 20. Due thereto, water that flows on the obverse (the surface at the vehicle upper side) of the sunken portion 32 of the BD glass 30 flows onto the top surface of the BD panel 20 (refer to arrow A1).

The HMSL 60 is disposed at the rear side of the spoiler 50. The HMSL 60 has a top surface 62 that is a shape that runs along an imaginary line extending along the top surface of the main body portion 52 of the spoiler 50 toward the vehicle rear side. At the rear end of the top surface 62, the HMSL 60 is a shape that is pointed toward the vehicle rear side. Further, a lower end portion 64 of the HMSL 60 is positioned lower than the upper end of the BD lower glass 40, and the HMSL 60 hides the upper portion 40U of the BD lower glass 40 from the vehicle rear side. Further, a gap is formed between the lower end portion 64 of the HMSL 60 and the BD lower glass 40, and the water that flows on the top surface of the BD panel 20 is drained-out from this gap (refer to arrow A2).

Figure 4:
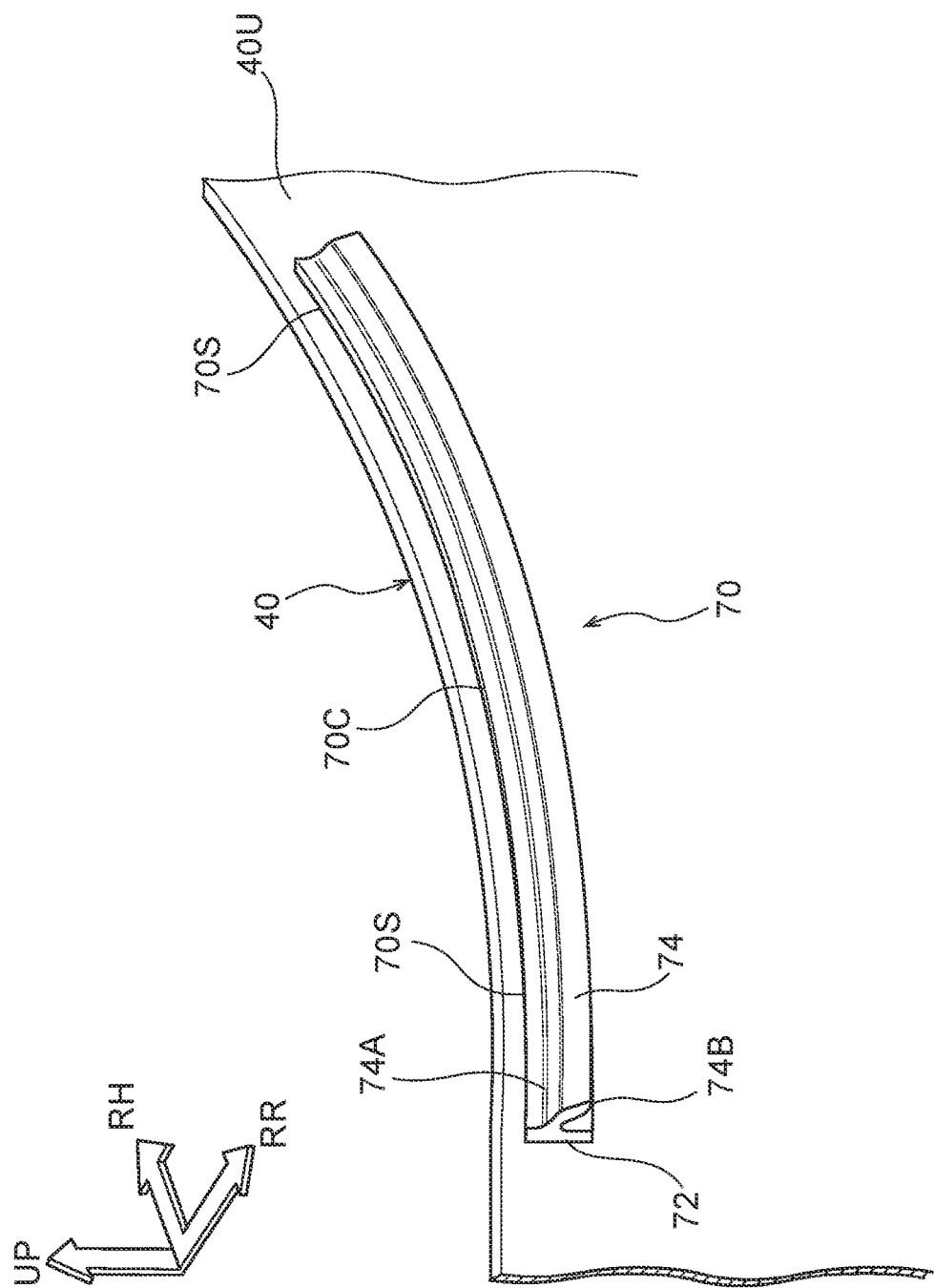
FIG. 4 is a perspective view that is seen from the vehicle rear side and shows, in an enlarged manner, an additional member that is mounted to a back door lower glass.

An additional member 70 which is made of a synthetic resin is mounted to the obverse (the surface at the vehicle rear side) of the upper portion 40U of the BD lower glass 40. As shown in FIG. 4, the additional member 70 is elongated, and is mounted to the upper portion of the BD lower glass 40 in a state in which the length direction thereof is the substantially vehicle transverse direction. The additional member 70 is provided at the portion that is slightly wide in the vehicle transverse direction and includes the vehicle transverse direction center, i.e., is provided at the vehicle transverse direction central portion, and is not provided all the way to the vehicle transverse direction both end portions. Further, as shown in FIG. 4, the shape of the upper end of the BD lower glass 40 at the vehicle transverse direction central portion thereof is a curved shape that is convex toward the vehicle lower side. The additional member 70 is disposed along the shape of the upper end of the BD lower glass 40 at the vehicle transverse direction central portion. Due thereto, a vehicle transverse direction central portion 70C of the additional member 70 is positioned at the vehicle lower side with respect to vehicle transverse direction both end portions 70S of the additional member 70.

Figure 5:
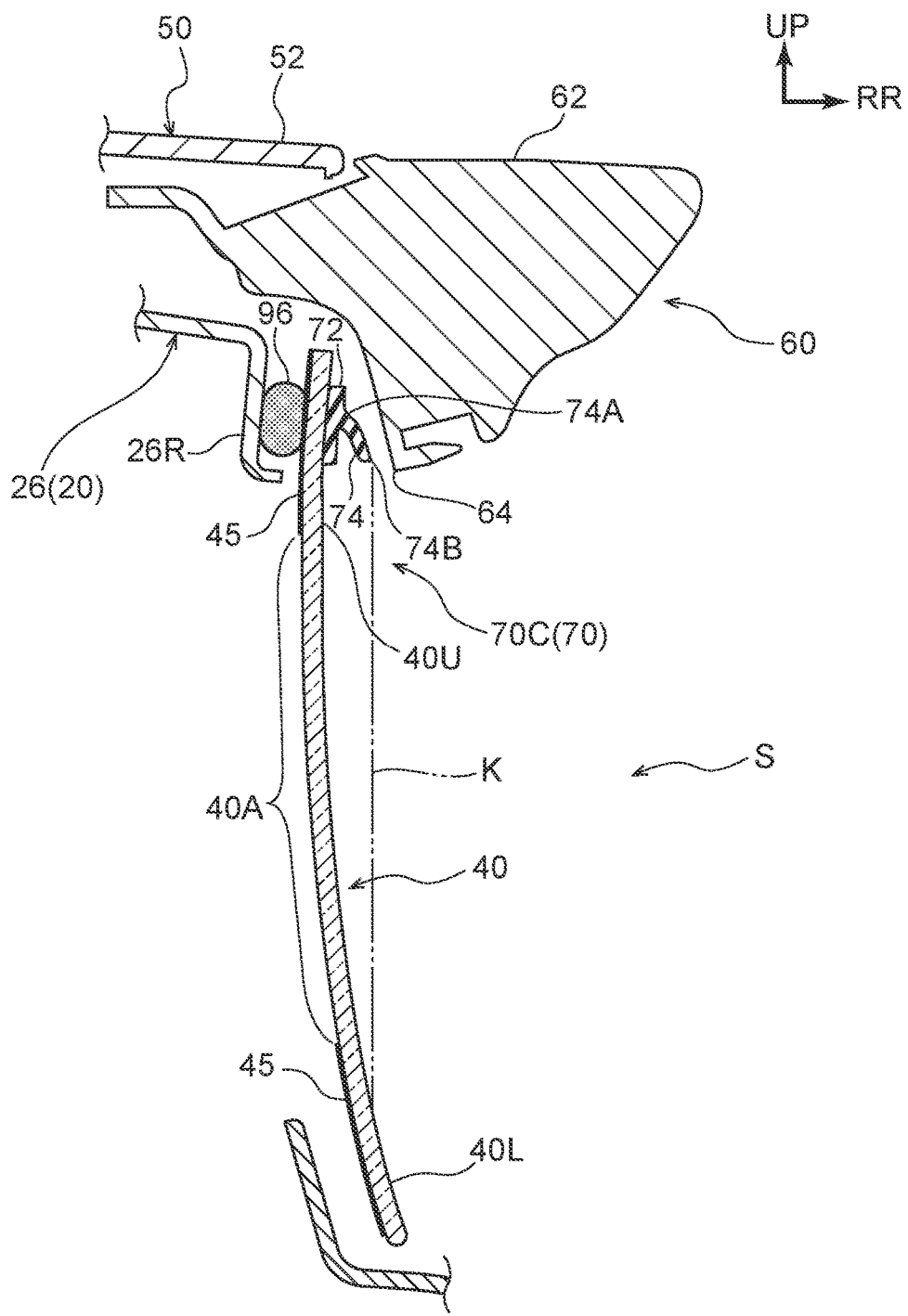
FIG. 5 is a cross-sectional view showing, in an enlarged manner, the back door lower glass of FIG. 1.

As shown in an enlarged cross-sectional view in FIG. 5, the additional member 70 has an adhered portion 72 that is adhered to the BD lower glass 40, and a projecting portion 74 that projects-out toward the vehicle rear side from the adhered portion 72. The adhered portion 72 is formed in the shape of a plate whose plate thickness direction is the substantially vehicle longitudinal direction. The vehicle front side surface of the adhered portion 72 is adhered to the obverse of the upper portion 40U of the BD lower glass 40. The projecting portion 74 projects-out toward the vehicle rear side with the vertical direction intermediate portion of the adhered portion 72 being a proximal end 74A of the projecting portion 74. A distal end 74B of the projecting portion 74 is positioned further toward the vehicle rear side and the vehicle lower side than the proximal end 74A. Namely, the projecting portion 74 projects-out obliquely downward toward the vehicle rear side and the vehicle lower side from the proximal end 74A toward the distal end 74B thereof.

As shown by two-dot chain line K in FIG. 5, when imagining the virtual line K that extends toward the vehicle lower side from the distal end 74B of the projecting portion 74, this virtual line K intersects the portion (the non-transmissive portion), at which ceramic printing 45 is carried out on the lower portion 40L, of the BD lower glass 40, and is positioned further toward the vehicle rear side than the transmissive portion 40A of the BD lower glass 40.

<Operation/Effects>

Operation and effects of the vehicle rear portion structure S of the present embodiment are described next.

At the vehicle rear portion structure S of the present embodiment, as shown in FIG. 2, the sunken portion 32, which is sunken-in toward the substantially vehicle lower side with respect to the portions that are adjacent thereto in the vehicle transverse direction, is formed in the BD glass 30 that is provided at the vehicle rear portion. Therefore, as shown by arrows F in FIG. 3, it is easy for the water, which flows on the obverse of the BD glass 30 toward the vehicle rear side, to collect in the sunken portion 32 that is formed in the vehicle transverse direction central portion. Further, the BD lower glass 40, whose plate thickness direction is the substantially vehicle longitudinal direction, is provided further toward the vehicle rear side and vehicle lower side than the BD glass 30. As shown in FIG. 1, the water that flows from the sunken portion 32 of the BD glass 30 is led toward the BD lower glass 40 by the rear frame portion 26 of the BD panel 20 that is provided between the BD glass 30 and the BD lower glass 40. Therefore, there is the concern that the drainage water that flows to the BD lower glass 40 will concentrate at the vehicle transverse direction central portion at which the sunken portion 32 is formed.

Here, as shown in FIG. 5, the vehicle rear portion structure S of the present embodiment has the additional member 70. Therefore, the drainage water, which starts to flow on the obverse (the surface at the vehicle rear side) of the BD lower glass 40, first hits the upper portion of the adhered portion 72 of the additional member 70, and then flows on the projecting portion 74 of the additional member 70, and drips downward from the distal end 74B of the projecting portion 74.

In this way, the drainage water from the BD panel 20 is guided by the upper portion of the adhered portion 72 and the projecting portion 74 to a position that is away, toward the vehicle rear side, from the obverse (the surface at the vehicle rear side) of the BD lower glass 40 (i.e., is guided to the distal end 74B of the projecting portion 74). Namely, in the present embodiment, the upper portion of the adhered portion 72 and the projecting portion 74 correspond to the "guide portion". Accordingly, water sticking to the obverse of the BD lower glass 40 is suppressed, and, as a result, the occurrence of rain stains at the BD lower glass 40 is suppressed.

Further, the spoiler 50 and the HMSL 60 that cover the rear frame portion 26 of the BD panel 20 from the vehicle outer side are provided at the vehicle rear portion structure S of the present embodiment, and, of these, the HMSL 60 makes it such that the additional member 70 cannot be seen from the vehicle rear side. Therefore, a deterioration in the design due to the provision of the additional member 70 can be suppressed. Namely, the spoiler 50 and the HMSL 60 together correspond to the "exterior member".

Further, at the vehicle rear portion structure S of the present embodiment, the additional member 70 is mounted to the obverse of the upper portion 40U of the BD lower glass 40. Therefore, drainage water, which starts to flow on the obverse of the BD lower glass 40, can be guided effectively toward the vehicle rear side.

In the vehicle rear portion structure S of the present embodiment, the BD lower glass 40 is curved so as to be convex toward the vehicle front side as seen in a vehicle side view. Therefore, it is difficult for the drainage water that drips down from the additional member 70 to hit the BD lower glass 40, as compared with a case in which the positions of the upper end and the lower end of the BD lower glass 40 as they are and the shape of the BD lower glass 40 is convex toward the vehicle rear side as seen in a vehicle side view.

Further, in the vehicle rear portion structure S of the present embodiment, the virtual line K, which extends-down vertically toward the vehicle lower side from the distal end 74B of the projecting portion 74, is positioned further toward the vehicle rear side than the transmissive portion 40A that is transmissive of the BD lower glass 40. Accordingly, for example, in a case in which the vehicle 10 is parked in a flat place, it is difficult for the drainage water that drips down from the distal end 74B of the projecting portion 74 to stick to the transmissive portion 40A of the BD lower glass 40. Accordingly, the occurrence of rain stains at the transmissive portion 40A of the BD lower glass 40 is suppressed, and the rearward visibility can be ensured to be good.

In the vehicle rear portion structure S of the present embodiment, as shown in FIG. 5, the distal end 74B of the projecting portion 74 is adjacent to the HMSL 60. Therefore, there are cases in which the drainage water, which is guided toward the vehicle rear side by the additional member 70, runs along the HMSL 60 and drips down from the lower end portion 64 of the HMSL 60 that is formed in a shape that is pointed toward the vehicle lower side. Because the lower end portion 64 of the HMSL 60 is positioned further toward the vehicle rear side than the distal end 74B of the projecting portion 74, drainage water sticking to the BD lower glass 40 is suppressed even more.

Modified Example

Figure 6:
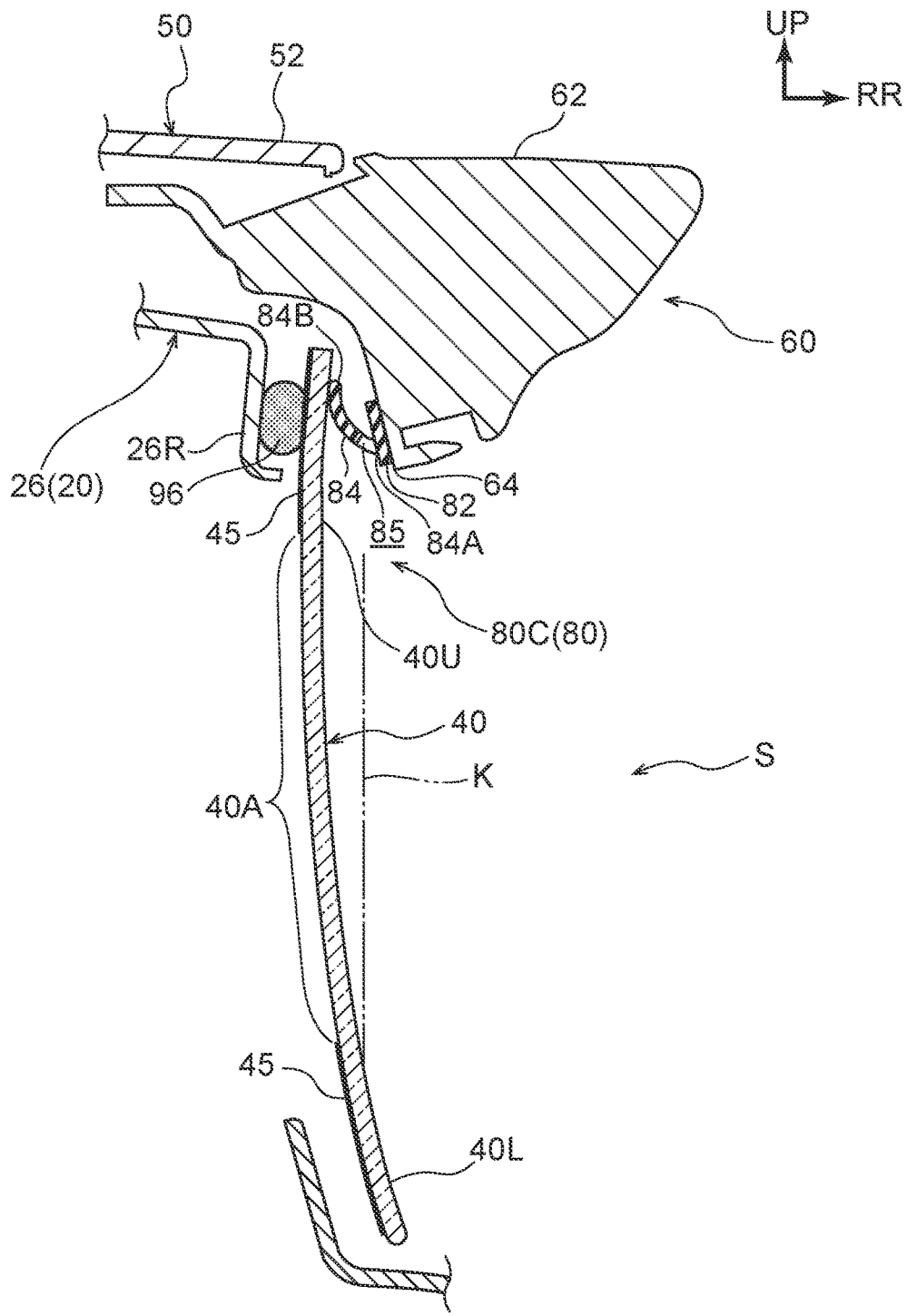
FIG. 6 is a cross-sectional view showing an additional member relating to a modified example.

An additional member 80 relating to a modified example is described next by using FIG. 6. Note that, because structures other than the additional member 80 are the same as those of the above-described embodiment, they are denoted by the same reference numerals in the drawings, and description thereof is omitted.

The member to which the additional member 80 relating to the modified example is mounted is not the BD lower glass 40, and instead, is the HMSL 60. The additional member 80 has an adhered portion 82 that is adhered to the HMSL 60, and a projecting portion 84 that projects-out toward the vehicle front side from the adhered portion 82. A through-hole 85 is formed in a proximal end 84A side of the projecting portion 84. Further, the additional member 80 is formed of an elastic material such as a rubber material that is elastic, or the like. A distal end 84B of the projecting portion 84 is pushed-against the obverse (the surface at the vehicle rear side) of the upper portion 40U of the BD lower glass 40, and the projecting portion 84 is in a state of being deformed toward the upper side.

In the same way as the additional member 70 of the above-described embodiment, the additional member 80 is elongated, and the length direction thereof is the substantially vehicle transverse direction. Seen from the vehicle rear side, the additional member 80 is a shape that is curved so as to be convex toward the vehicle lower side. Due thereto, a vehicle transverse direction central portion 80C of the additional member 80 is positioned at the vehicle lower side with respect to the vehicle transverse direction both end portions thereof. The aforementioned through-hole 85 is formed only in the vehicle transverse direction central portion 80C of the additional member 80.

<Operation/Effects>

In the same way as in the above-described embodiment, the following operation and effects are achieved by the additional member 80 relating to the modified example.

Namely, the drainage water, which starts to flow on the obverse (the surface at the vehicle rear side) of the BD lower glass 40, first hits the distal end 84B of the projecting portion 84 of the additional member 80, and then flows on the projecting portion 84, and drips downward from the through-hole 85 that is formed in the projecting portion 84. Note that, as seen from the vehicle rear side, the additional member 80 is a shape that is curved so as to be convex toward the vehicle lower side, and the vehicle transverse direction central portion 80C thereof is positioned at the vehicle lower side with respect to the vehicle transverse direction both end portions. Therefore, the drainage water that flows on the projecting portion 84 gathers at the vehicle transverse direction central portion, and drips downward from the through-hole 85. In this way, the drainage water from the BD panel 20 is guided by the projecting portion 84 to a position that is away, toward the vehicle rear side, from the obverse (the surface at the vehicle rear side) of the BD lower glass 40 (i.e., is guided to the position of the through-hole 85 of the projecting portion 84). Namely, in the present embodiment, the projecting portion 84 corresponds to the "guide portion". Accordingly, water sticking to the obverse of the BD lower glass 40 is suppressed, and, as a result, the occurrence of rain stains at the BD lower glass 40 is suppressed.

Further, the additional member 80 relating to the modified example is mounted to the HMSL 60, and the projecting portion 84 of the additional member 80 is in a state of being pushed-against the obverse (the surface at the vehicle rear side) of the BD lower glass 40. Therefore, even if the positional relationship between the HMSL 60 and the BD lower glass 40 is offset slightly due to dimensional tolerance or the like, a state in which the distal end 84B of the projecting portion 84 of the additional member 80 contacts the BD lower glass 40 is realized.

[Supplemental Explanation]

Note that the above embodiment describes an example in which the position at which the sunken portion 32 is formed is the vehicle transverse direction central portion of the BD glass 30. However, the position at which the sunken portion 32 is formed may be a position that is offset toward a vehicle transverse direction outer side with respect to the vehicle transverse direction central portion. For example, two sunken portions may be formed symmetrically in the vehicle transverse direction with the vehicle transverse direction central portion of the BD glass disposed therebetween.

Further, the above embodiment describes an example in which the sunken portion 32 is formed in a range of the BD glass 30 from the central portion in the longitudinal direction to the rear end portion, and the sunken portion 32 is not formed in the front portion of the BD glass 30. However, the sunken portion may be formed over the entire longitudinal direction of the BD glass.

Further, the above embodiment describes an example in which the BD lower glass 40 that serves as the "second glass" is curved so as to be convex toward the vehicle front side as seen in a vehicle side view. However, the shape of the second glass is not limited to this, and the second glass does not have to be curved as seen in a vehicle side view, or may be curved so as to be convex toward the vehicle rear side as seen in a vehicle side view.

The above embodiment describes an example in which the imaginary line K, which extends toward the vehicle lower side from the distal end 74B of the projecting portion 74, intersects the portion of the BD lower glass 40 at which ceramic printing 45 of the lower portion 40L is carried out. However, the imaginary line that extends toward the vehicle lower side from the distal end of the projecting portion does not have to intersect the BD lower glass. Further, this imaginary line may intersect the transmissive portion of the BD lower glass.

Further, the above embodiment describes an example in which the additional member 70, 80 is provided at the portion that is slightly wide in the vehicle transverse direction and includes the vehicle transverse direction center, i.e., is provided at the vehicle transverse direction central portion, and is not provided at the vehicle transverse direction both end portions. However, the additional member may be provided over substantially the entire vehicle transverse direction of the back door lower glass.

The above modified example describes an example in which the through-hole 85 of the projecting portion 84 is formed only in the vehicle transverse direction central portion 80C of the additional member 80. However, plural through-holes of the projecting portion may be formed so as to be lined-up in the vehicle transverse direction.

What is claimed is:

1. A vehicle rear portion structure comprising:
    a first glass that is provided at a vehicle rear portion, and at which is formed a sunken portion that is sunken-in further toward a substantially vehicle lower side than portions adjacent thereto in a vehicle transverse direction;
    a second glass that is provided further toward a vehicle rear side and a vehicle lower side than the first glass, and that is disposed with a plate thickness direction thereof being a vehicle longitudinal direction;
    a connecting portion that is provided between the first glass and the second glass, and that leads drainage water, which flows from the sunken portion, to the second glass; and
    an additional member having a guide portion that extends toward a vehicle rear side from an upper portion of the second glass, and that guides the drainage water from the connecting portion to a position that is away, toward a vehicle rear side, from a vehicle rear side surface of the second glass.

2. The vehicle rear portion structure of claim 1, further comprising an exterior member that covers the connecting portion from a vehicle outer side,
    wherein the additional member is hidden by the exterior member when seen from a vehicle rear side.

3. The vehicle rear portion structure of claim 1, wherein the additional member is mounted to a vehicle rear side surface of the upper portion of the second glass.

4. The vehicle rear portion structure of claim 2, wherein the additional member is mounted to the exterior member, and
    the guide portion is disposed in a state of being pushed against a vehicle rear side surface of the second glass.

5. The vehicle rear portion structure of claim 1, wherein the second glass is curved so as to be convex toward a vehicle front side as seen in a vehicle side view.

6. The vehicle rear portion structure of claim 1, wherein an imaginary line, which extends down vertically toward a vehicle lower side from a vehicle rear side end portion of the guide portion, is positioned further toward a vehicle rear side than a transmissive portion of the second glass.

7. The vehicle rear portion structure of claim 1, wherein the additional member is provided at a vehicle transverse direction central portion.

8. The vehicle rear portion structure of claim 4, wherein, at the guide portion, a through-hole is formed in a vehicle transverse direction central portion of the additional member.

9. The vehicle rear portion structure of claim 1, wherein the sunken portion is formed in a vehicle transverse direction central portion of the first glass.

10. The vehicle rear portion structure of claim 1, wherein the sunken portion is formed in a range that is from a vehicle longitudinal direction central portion to a rear end portion of the first glass.

* * * * *